United States Patent [19]

van de Plassche

[11] 3,838,262

[45] Sept. 24, 1974

[54] FOUR-QUADRANT MULTIPLIER CIRCUIT

[75] Inventor: Rudy Johan van de Plassche, Emmasingel, Eindhoven, Netherlands

[73] Assignee: U.S. Philips Corporation, New York, N.Y.

[22] Filed: July 25, 1973

[21] Appl. No.: 382,591

[30] Foreign Application Priority Data

Aug. 3, 1972 Netherlands ........................ 7210633

[52] U.S. Cl. ................ 235/194, 307/229, 330/30 D

[51] Int. Cl. ............................................ G06g 7/16

[58] Field of Search ........... 235/194, 195, 196, 197; 307/229; 328/160, 161; 330/69, 30 D

[56] References Cited

UNITED STATES PATENTS 3,536,904 10/1970 Jordan ................................ 235/194

3,633,005 1/1972 Leighton ......................... 235/194 X 3,683,165 8/1972 Grobert et al. ..................... 235/194

*Primary Examiner*—Joseph F. Ruggiero

*Attorney, Agent, or Firm*—Frank R. Trifari; Henry I. Steckler

[57] ABSTRACT

A four-quadrant multiplier circuit, constituted in a known manner by three differential stages, one stage of which receives the x-signal and supplies the current for the two other stages, which receive the y-signal in parallel. From the output currents of these two last-mentioned differential stages such sum currents are formed with the aid of multiple current mirrors that these currents are suitable to be applied to the two inputs of the circuit as negative-feedback currents. By also applying the input signals as currents an effective negative feedback system is obtained.

11 Claims, 2 Drawing Figures

FOUR-QUADRANT MULTIPLIER CIRCUIT

The invention relates to a four-quadrant multiplier circuit for multiplying a first and a second input signal, comprising a first differential stage with a first and a second transistor, to whose control electrodes the first input signal is applied as a differential signal and whode common-electrode circuit includes a current source, a second differential stage with a third and a fourth transistor, whose common-electrode circuit includes the main current path of the first transistor and to whose control electrodes the second input signal is applied as a differential signal, and a third differential stage with a fifth and a sixth transistor, whose common-electrodes circuit includes the main current path of the second transistor, the control electrode of the fifth transistor being connected to the control electrode of the fourth transistor and the control electrode of the sixth transistor to the control electrode of the third transistor, and the desired output signal, which is proportional to the product of the two input signals, being obtained by a suitable combination of the output currents of the transistors of the second and the third differential stage.

The accuracy attainable with such a multiplier circuit is limited by several factors. In this connection the mutual differences between the various transistors of the circuit arrangement are to be mentioned first. Therefore, the use of matched transistor pairs is preferred for the differential stages in multiplier circuits consisting of discrete components, whilst in integrated-circuit embodiments optimum equality of the transistors is pursued through the use of very accurate integrated circuit techniques.

A second important factor is the method of converting the applied input signals into the current components utilized in the multiplier circuit. This conversion is effected via a non-linear element, which introduces undesired distortions, resulting again in product formation errors.

Finally, the base currents of the transistors show deviations which, of course, increase as the current gain factors of the transistors decrease. In addition, the various transistors may have mutually different current gain factors, which moreover may vary, for example, under the influence of temperature fluctuations, thus causing considerable and unpredictable product-formation errors.

It is an object of the invention to provide a multiplier circuit which is capable of very accurate product formation, and in which particularly the effect of the two last-mentioned factors is substantially reduced as compared with known circuit arrangements.

For this purpose the invention is characterized in that the circuit comprises a first multiple current mirror, which supplies a first and a second output current, which are in fixed relationship with the output current of the fourth transistor which is applied to the input, of the current mirror, first adding means by means of which a first sum current is formed from the output current of the third transistor and the first output current of the first current mirror, second adding means by means of which a second sum current is formed from the output current of the fifth transistor and the second output current of the first current mirror, first negative-feedback means via which the first sum current is fed back degeneratively to the input of the first differential stage and second negative-feedback means via which the second sum current is fed back degeneratively to the input of the second differential stage, the two input signals being applied to said inputs of the multiplier circuit as currents.

In this context a current mirror is defined as a circuit having at least one input, one output and one or more further terminals, the current at the output always being automatically in a fixed relationship with the current at the input. For this, use is generally made of the fact that transistors and transistors connected as diodes, which are connected in parallel and are integrated on the same semiconductor area, carry currents whose relative values are accurately defined by the geometry of said elements, specifically the emitter areas of the transistors. Connecting two such elements, specifically the base-emitter junctions, in parallel in the input circuit and the output circuit, so that automatically always the same voltage is imposed upon them, ensures a fixed relationship between input and output current, which is defined by the geometry of these active elements. Such a current mirror may comprise a further connection, at which the sum of the input and output currents is available, the so-termed sum terminal. Also known are so-called "floating" current mirrors, which have two further connections, of which one is included in the input circuit and the other in the output circuit, carrying the input current and the output current respectively.

A multiple current mirror is defined as a current mirror having several outputs, each carrying an output current which is in a fixed relationship with the input current. Generally this is achieved in an identical way as with the single current mirror by including an active element in each output circuit and connecting it in parallel with the relevant active element in the input circuit. The "floating" current mirror is automatically a multiple current mirror, but may also be extended in the previously described manner.

The use of the first multiple current mirror permits a current which is at least proportional to the output current of the fourth transistor to be used twice in ways which are independent of each other. This feature is utilized for providing two negative-feedback currents which do not adversely affect each other and which are suited to be applied one to the input of the first differential stage and the other to the input of the second differential stage. This is achieved by forming a first sum current with the aid of first adding means, which is at least proportional to the sum of the output current of the third transistor and the first output current of the first current mirror and by applying this sum current to the relevant input of the multiplier circuit via first negative feedback means, which may be a direct connection if the signal component present in this sum current is of a suitable polarity. By means of second adders means the invention permits a second sum current to be formed at the same time, which is at least proportional to the sum of the output current of the fifth transistor and the second output current of the first current mirror and which sum current yields a suitable negative feedback current for the second input of the multiplier circuit via seocnd negative feedback means.

By also applying the input signals as currents to the two inputs of the multiplier circuit an effective negative feedback system is obtained, so that both the influence of the finite current gain factor of the transistors on the product formation is substantially eliminated and a correct conversion of the two input signals into current components which are active in the circuit is guaranteed.

It is to be noted that the IEEE Journal of Solid State Circuits, August 1970, pages 150–159 describes a four quadrant multiplier circuit in which negative voltage feedback to one input is provided. However, it is obvious that the method described in said article permits negative feedback to one input only, so that the resultant improvement is relatively small.

Only by the use according to the invention of at least one multiple current mirror it is possible in a simple manner to obtain negative feedback to both inputs, because this permits two currents, which are each representative of the output current of the fourth transistor, to be used independently of each other to obtain the required negative feedback currents. The summation of the various currents in order to obtain the desired negative feedback currents can be effected in a very simple manner by applying the output currents of the third and fifth transistor each to a current mirror and by interconnecting the outputs of the relevant current mirrors.

The sum currents realized in this manner each contain a d.c. component, which should be compensated for at the two inputs with the aid of a current source. An automatic compensation of this d.c. component at an input is possible by supplying to the relevant input a second negative feedback current which contains the desired component with the same sign as and the d.c. component with a sign opposite to that of, the first negative feedback current to this input, which can simply be achieved by a suitable choice of combinations of the output currents of the third, fourth, fifth and sixth transistors. When one of the output currents of the transistors must be available several times in order to realize the desired negative feedback currents, this can be achieved by applying this output current to a multiple current mirror and by using the output currents of this mirror for the summation with the other output currents.

In the most comprehensive embodiment of the multiplier circuit each of the output currents of the transistors of the second and the third differential stage is then applied to a multiple current mirror and from the output currents of these current mirrors four sum currents are derived, two of which are fed back degeneratively to the input of the first differential stage and the other two to the input of the second differential stage, the negative-feedback currents applied to a certain input containing the desired signal component with the same sign and the d.c. component with the opposite sign.

The two negative feedback currents may then be supplied to the base of one and the same transistor of the relevant differential pair, whilst one of the two sum currents is to be applied via an additional current mirror to said base in order to obtain the desired polarities of the various components. However, it is also possible to apply one of the negative-feedback currents to the base of the first and the other negative feedback current to the base of the second transistor of the relevant differential stage. In the latter case, however, provisions have to be made to compensate for the d.c. components in the negative feedback currents.

The invention will now be described in more detail, by way of example, with reference to the drawing, in which two embodiments of the four-quadrant multiplier circuit according to the invention are given. Corresponding elements are designated by the same reference letters and numerals.

Figure 1:
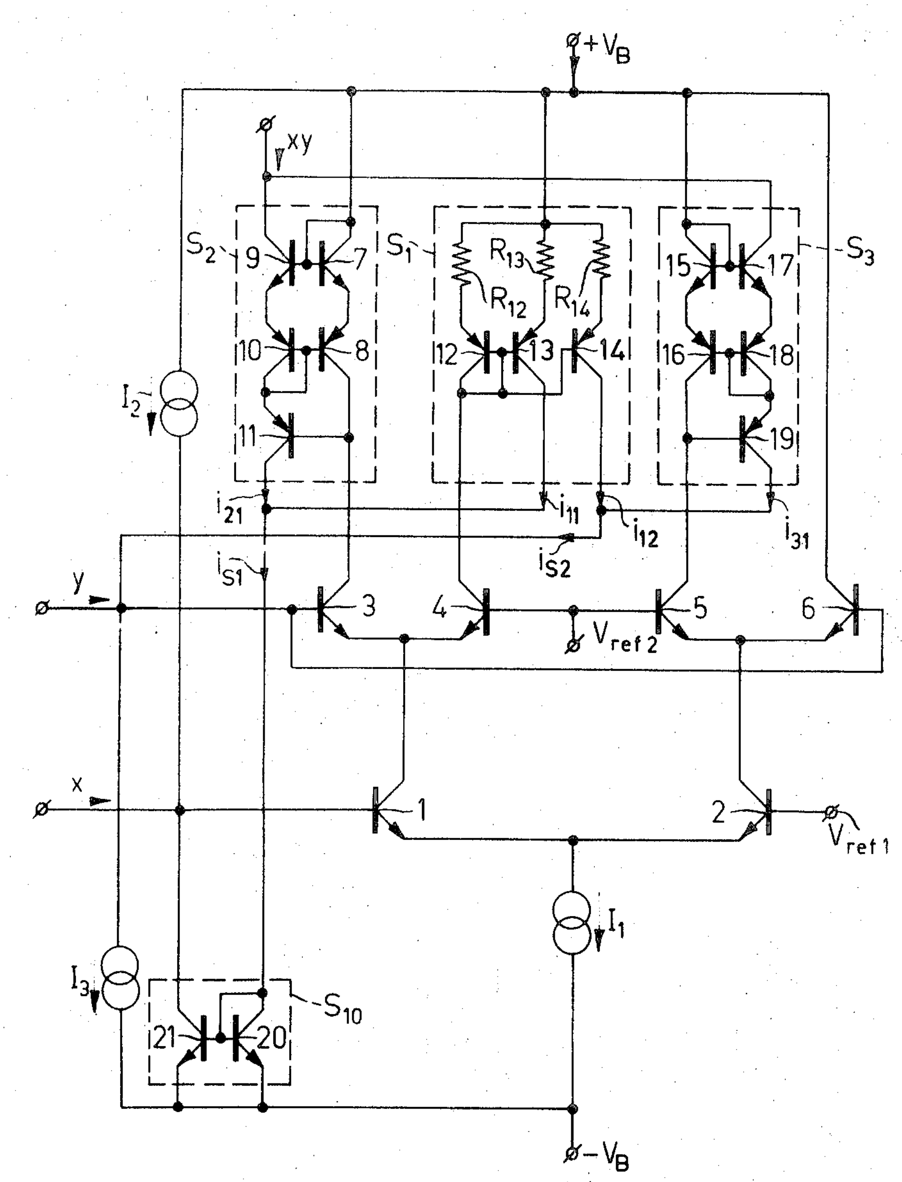
FIG. 1 shows a schematic diagram of a first embodiment of the invention.

The first embodiment of the multiplier circuit according to the invention as shown in FIG. 1 comprises in known manner three differential stages with npn-type transistors 1 and 2, 3 and 4, 5 and 6 respectively, the emitter currents of the transistors 3 and 4 being supplied by transistor 1 and the emitter currents of the transistors 5 and 6 by transistor 2. The emitter currents of these transistors 1 and 2 are, in turn, supplied by a current source $I_1$. A first input signal is applied as a differential signal to the bases of the transistors 1 and 2 and a second input signal is applied as a differential signal to the bases of the transistors 3 and 4, which bases are also connected to the bases of the transistors 5 and 6. In the embodiment shown the bases of transistor 2 and transistors 4 and 5 are connected to a reference voltage $V_{ref1}$ and $V_{ref2}$ respectively and the input signals $x$ and $y$ are applied as currents to the bases of transistor 1 and transistors 3 and 6 respectively.

As is evident from the Figure, the current supplied by the current source $I_1$ is distributed over the transistors 3 through 6 in accordance with the magnitude of the $x$ and the $y$ signal. By summation of two suitably selected output currents of these transistors, for example the output currents of the transistors 3 and 5, a current is obtained which is proportional to the product $xy$.

The collector current of transistor 4 is supplied to the input of a first, multiple current mirror $S_1$. This current mirror comprises, by way of example, three pnp-type transistors 12, 13 and 14, whose bases are interconnected, whose emitters are connected via resistors $R_{12}$, $R_{13}$ and $R_{14}$ to a sum terminal and of which transistor 12 is connected as a diode. This arrangement ensures that a current supplied to transistor 12 is reproduced in the collectors of transistors 13 and 14 with a fixed ratio, which is determined by the values of the resistors $R_{12}$ through $R_{14}$ and the areas of the transistors. In the simplest case the transistors and the resistors are identical, so that the two output currents $i_{11}$, $i_{12}$ of the current mirror $S_1$ always equal the input current, i.e equal the collector current of transistor 4.

The collector current of transistor 3 is supplied to the input of a second current mirror $S_2$, which, by way of example, is of the floating type. The input circuit of this current mirror includes an npn-transistor 7 which is connected as a diode and in series therewith the emitter-collector path of a pnp-transistor 8. The output circuit of said current mirror includes the series-connected main current paths of an npn-transistor 9 and two pnp-transistors 10 and 11, transistor 10 being connected as a diode. The bases of transistors 7 and 9 are interconnected, as are those of the transistors 8 and 10 whilst the base of transistor 11 is connected to the input of the current mirror, i.e. the collector of transistor 8. Owing to this arrangement the sum of the base-emitter voltages of the transistors 9 and 10 in the output circuit necessarily equals the sum of the base-emitter voltages of the transistors 7 and 8 in the input circuit, so that if the transistor geometries are equal the output current always equals the input current.

The collector current of transistor 5 is applied to the input of a third current mirror $S_3$, which in an identical manner as the current mirror $S_2$ consists of transistors 15 through 19. A first sum current $i_{S1}$ is generated in that the output of the current mirror $S_2$ is connected to an output of the current mirror $S_1$, whilst a second sum current $i_{S2}$ is generated in that the output of the current mirror $S_3$ is connected to the remaining output of the current mirror $S_1$. The first sum current $i_{S1}$ is applied to a current mirror $S_{10}$ which in known manner consists of a diode-transistor configuration 20 and 21 and whose output is connected to the base of transistor 1 of the first differential stage. The second sum current $i_{S2}$ is applied directly to the base of transistor 3 of the second differential stage. Moreover, a d.c. component derived from a current source $I_2$ and $I_3$ is applied to the base of transistor 1 and of transistor 3 respectively.

The negative-feedback currents can be calculated in a simple manner. Assuming that the current source $I_1$ supplies a current 4I, the collector currents $i_3$ through $i_6$ of the transistors 3 through 6 may initially be expressed in a known manner by:

$$i_3 = (1 + x + y + xy)\ I$$
$$i_4 = (1 + x - y - xy)\ I$$
$$i_5 = (1 - x - y + xy)\ I$$
$$i_6 = (1 - x + y - xy)\ I \qquad (1)$$

Assuming that all the current mirrors reproduce the currents applied to their inputs at their outputs with unity gain, the output current $i_{21}$ and $i_{31}$ resp. of the current mirror $S_2$ and $S_3$ equals $i_3$ and $i_5$ respectively, and the two output currents $i_{11}$, $i_{12}$ of the current mirror $S_1$ equal $i_4$. This means that the first sum current $i_{S1}$ which comprises the output current $i_{21}$ of the current mirror $S_2$ and the collector current $i_{11}$ of transistor 13 of the current mirror $S_1$ equals $i_3 + i_4 = (1 + x)$ 2I, so that besides a d.c. component this sum current initially only contains an X-component. By applying this sum current via a current mirror $S_{10}$ to the base of transistor 1, a negative feedback current is obtained at this input which equals $-(1 + x)$ 2I, thus providing full negative feedback of the x-component. The d.c. component −2I contained in this negative-feedback current is supplied by the current source $I_2$, but may of course, also be included in the input current.

The second sum current $i_{S2}$ which is generated by summation of the output current $i_{31}$ of the current mirror $S_3$ and the collector current $i_{12}$ of transistor 14, initially equals $i_4 = i_5 = (1 - y)$ 2I in accordance with (1), so that besides the d.c. component primarily this sum current only contains the y-component. By applying said sum current directly to the base of transistor 3 full negative feedback of this y-component is achieved. The d.c. component 2I contained in the negative-feedback current is supplied by the current source $I_3$.

Accordingly, the use of current mirrors, specifically the multiple current mirror $S_1$, permits the application of negative feedback to both inputs ($x$ and $y$) of the multiplier circuit.

Several modifications of the described method of generating the desired sum currents are possible. For example, instead of the current mirror $S_1$ it is also possible to use a floating current mirror similar to $S_2$ and $S_3$. These floating current mirrors such as $S_2$ already comprise a fist output, the collector of transistor 11, a second output, the collector of transistor 9, and sometimes a third output, the collector of transistor 7. If such a floating current mirror is used for the current mirror $S_1$, its first output may again be connected to the first output of the current mirror $S_2$ in order to obtain the first sum current. To obtain the second sum current, the second output of said floating current mirror may be connected to the collector of transistor 5, after which the second sum current thus generated is processed with the aid of current mirror $S_3$. It will be obvious that in this case the levels between the various components should be suitably adapted.

In a second modification the x-signal is applied to the base of transistor 2 instead of transistor 1, whilst the base of transistor 1 is connected to the reference voltage $V_{ref1}$. The first sum current then equals $i_3 + i_4 = (1 - x)$ 2I, so that this sum current may be applied directly to the base of transistor 2 in order to obtain the desired negative feedback, thus obviating the use of the additional current mirror $S_{10}$.

The desired product can simply be obtained by adding the collector current of transistor 9 of the current mirror $S_2$ to the collector current of transistor 17 of current mirror $S_3$, yielding a current $i_3 + i_5 = (1 + xy)$ 2I.

Figure 2:
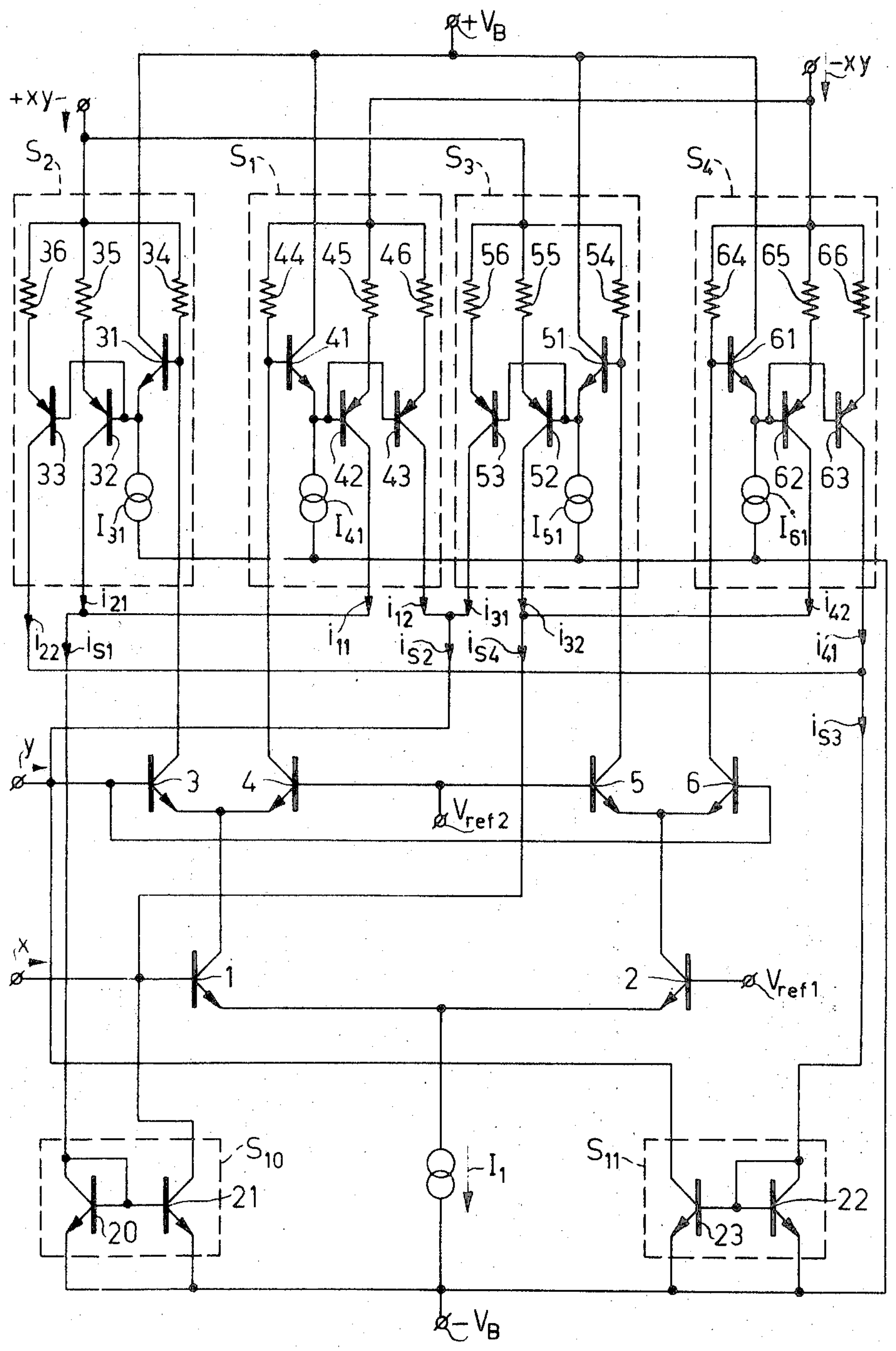
FIG. 2 shows a schematic diagram of a second embodiment.

FIG. 2 shows a second embodiment of the multiplier circuit according to the invention. The circuit arrangement in accordance with FIG. 1 comprises three differential stages with transistors 1 through 6 to which in a corresponding manner the input signals $x$ and $y$ are applied. However, contrary to FIG. 1, each of the collector currents $i_3$ to $i_6$ of the transistors 3 to 6 is individually applied to a multiple current mirror. As the four current mirrors $S_1$ to $S_4$ are fully identical, only the circuit arrangement of the current mirror $S_1$ will be described in more detail.

The input current of the current mirror $S_1$, the collector current of transistor 4, is applied to a resistor 44. One end of this resistor 44 is connected to the sum terminal of the current mirror and its other end to the base of an npn-transistor 41 which is connected in emitter follower arrangement, which by means of a current source $I_{41}$ receives a quiescent current and whose collector is connected to the positive terminal $+V_B$ of the supply source. The emitter of this transistor 41 is, in turn, connected to the bases of two pnp-transistors 42 and 43, whose emitters are connected to the sum terminal of the current mirror via resistors 45 and 46, respectively. The collectors of the transistors 42 and 43 constitute. The two outputs of the current mirror which supply currents which are in a fixed ratio to the input current, which ratio can be fixed by means of the resistors 44, 45 and 46. Despite the generally low current amplification factor of the npn-transistors, the shown arrangement of the current mirror ensures a very accurate operation.

To obtain the desired negative-feedback currents the sum of an output current $i_{11}$ of the current mirror $S_1$ and an output current $i_{21}$ of the current mirror $S_2$ is produced first of all in accordance with the circuit arrangement of FIG. 1, yielding a sum current $i_3 + i_4 = (1 + x)$ 2I. After processing with the aid of a current mirror $S_{10}$ this yields $-(1 + x)$ 2I as negative-feedback current at the base of transistor 1. A second sum current $i_{S12}$ is generated again by summation of an output current $i_{31}$ of the current mirror $S_3$ and the second output current $i_{12}$ of the current mirror $S_1$, resulting in a current $i_4 + i_5 = (1 - y)\,2I$, which is applied directly to the base of transistor 3.

However, the circuit arrangement of FIG. 2, also produces a third and a fourth sum current. The fourth sum current $i_{S4}$ is obtained by summation of the second output $i_{32}$ current of the current mirror $S_3$ and the second output current $i_{42}$ of the current mirror $S_4$ and equals $i_5 + i_6 = (1 - x)\,2I$. This sum current is applied directly to the base of transistor 1, thus providing negative feedback for the x-component. The overall negative-feedback current to the base of transistor 1 is the sum of the first negative-feedback current from the output of the current mirror $S_{10}$ and the last-mentioned negative-feedback current: $-(1 + x)2I + (1 - x)2I = -4 \times I$, so that the d.c. component is fully compensated for.

The same is achieved at the y-input by applying the third sum current $i_{S3}$, which is the sum of the second output current $i_{22}$ of the current mirror $S_2$ and the first output current $i_{41}$ of the current mirror $S_4$, via a current mirror $S_{11}$ to the base of transistor 3.

The desired product current can be obtained in a very simple manner by interconnecting the sum terminals of the current mirrors $S_2$ and $S_3$, which results in an overall current of $(1 + xy)6I$. By interconnecting the sum terminals of the current mirrors $S_1$ and $S_4$ a second product current $(1 - xy)6I$ can be obtained.

A modification of the described circuit arrangement can be obtained by applying the input signals symmetrically, in such a way that instead of a reference signal $V_{ref1}$ the −x-component of the balanced x-signal is applied to the base of transistor 2 and instead of the reference signal $V_{ref2}$ the −y-component of the balanced y-signal is applied to the base of transistor 4. The first sum current may then be applied directly to the base of transistor 2, so that the current mirror $S_{10}$ can be dispensed with, and the fourth sum current may be applied directly to the base of transistor 4 so that current mirror $S_{11}$ becomes superfluous. Thus, the negative-feedback currents are also applied to the two inputs in a balanced manner. However, in this embodiment measures have to be taken again in order to compensate for the d.c. component in the negative feedback currents.

It will be obvious that still further modifications are possible, including different embodiments of the current mirrors, within the scope of the invention. The application of the input signals to the relevant inputs may, for example, take place by feeding input voltages to resistors which are connected to the bases of the relevant transistors.

What is claimed is:

1. A four-quadrant multiplier circuit for multiplying a first and a second input signal, comprising a first differential stage with a first and a second transistor, to whose control electrodes the first input signal is applied as a differential signal and whose common-electrode circuit includes a current source, a second differential stage with a third and a fourth transistor, whose common-electrode circuit includes the main current path of the first transistor and to whose control electrodes the second input signal is applied as a differential signal, and a third differential stage with a fifth and a sixth transistor, whose common-electrode circuit includes the main current path of the second transistor, the control electrode of the fifth transistor being coupled to the control electrode of the fourth transistor and the control electrode of the sixth transistor to the control electrode of the third transistor, and means for obtaining the desired output signal proportional to the product of the two input signals, including means for combining the output currents of the transistors of the second and the third differential stage, characterized in that the circuit comprises a first multiple current mirror, which supplies a first and a second output current, which are in a fixed relationship with the output current of the fourth transistor which is applied the input of this first current mirror, first adding means by means of which a first sum current is formed from the output current of the third transistor and the first output current of the first current mirror, second adding means by means of which a second sum current is formed from the output current of the fifth transistor and the second output current of the first current mirror, first negative-feedback means via which the first sum current is fed back degeneratively to the input of the first differential stage and second negative-feedback means via which the second sum current is fed back degeneratively to the input of the second differential stage, the two input signals being applied to said inputs of the multiplier circuit as currents.

2. A four-quadrant multiplier circuit as claimed in claim 1, characterized in that the first adding means includes a second current mirror to whose input the output current of the third transistor is applied and whose output current together with the first output current of the first current mirror constitutes the first sum current and that the second adding means includes a third current mirror, to whose input the output current of the fifth transistor is applied, and whose output current together with the second output current of the first current mirror constitutes the second sum current.

3. A four-quadrant multiplier circuit as claimed in claim 2, characterized in that the second current mirror is of a multiple type and supplies a first and a second output current, its first output current being used for the formation of the first sum current, and that third adding means are provided by means of which a third sum current is formed from the output current of the sixth transistor and the second output current of the second current mirror, said third sum current being fed back degeneratively via third negative-feedback means to the input of the second differential stage.

4. A four-quadrant multiplier circuit as claimed in claim 2, characterized in that the third current mirror is of a multiple type and supplies a first and a second output current, its first output current being used for the formation of the second sum current, and that third adding means are provided by means of which a fourth sum current is formed from the output current of the sixth transistor and the second output current of the third current mirror, said fourth sum current being fed back degeneratively via fourth negative-feedback means to the input of the first differential stage.

5. A four-quadrant multiplier circuit as claimed in claim 3, characterized in that the third adding means includes a fourth current mirror, to whose input the output current of the sixth transistor is applied and whose output current is used for the formation of the sum current supplied by said adding means.

6. A four-quadrant multiplier circuit as claimed in claim 3, characterized in that the third current mirror is of a multiple type and supplies a first and a second output current, its first output current being used for the formation of the second sum current, and that third adding means are provided by means of which a fourth sum current is formed from the output current of the sixth transistor and the second output current of the third current mirror, said fourth sum current being fed back degeneratively via fourth negative-feedback means to the input of the first differential stage, the third adding means includes a multiple current mirror, to whose input the output current of the sixth transistor is applied and which supplies a first and a second output current, said first current being used for the formation of the third sum current and said second current for the formation of the fourth sum current.

7. A four-quadrant multiplier circuit as claimed in claim 3, characterized in that the second and the third negative-feedback means are connected to the control electrode of one and the same transistor of the second differential stage, one of said negative-feedback means establishing a direct connection between the relevant adding means and said control electrode, and the other negative-feedback means including a current mirror by means of which an inversion of the relevant sum current is obtained.

8. A four-quadrant multiplier circuit as claimed in claim 4, characterized in that the first and the fourth negative-feedback means are connected to the control electrode of one and the same transistor of the first differential stage, one of the said negative-feedback means establishing a direct connection between the relevant adding means and said control electrode, and the other negative-feedback means including a current mirror by means of which an inversion of the relevant sum current is obtained.

9. A four-quadrant multiplier circuit as claimed in claim 6, characterized in that the two input signals are applied to the first and the second differential stage in a balanced manner and the negative-feedback currents destined for a certain input are also applied to the relevant input in a balanced manner.

10. A four-quadrant multiplier circuit as claimed in claim 4 wherein the third adding means includes a fourth current mirror, to whose input the output current of the sixth transistor is applied and whose output current is used for the formation of the sum current supplied by said adding means.

11. A four-quadrant multiplier circuit as claimed in claim 5 characterized in that the second and the third negative-feedback means are connected to the control electrode of one and the same transistor of the second differential stage, one of said negative-feedback means establishing a direct connection between the relevant adding means and said control electrode, and the other negative-feedback means including a current mirror by means of which an inversion of the relevant sum current is obtained.

* * * * *